United States Patent [19]

Pelrine

[11] Patent Number: 5,396,136
[45] Date of Patent: Mar. 7, 1995

[54] MAGNETIC FIELD LEVITATION

[75] Inventor: Ronald E. Pelrine, Menlo Park, Calif.

[73] Assignee: SRI International, Menlo Park, Calif.

[21] Appl. No.: 967,901

[22] Filed: Oct. 28, 1992

[51] Int. Cl.⁶ .............................................. H02K 7/09
[52] U.S. Cl. .................................................. 310/90.5
[58] Field of Search ........................ 335/216; 310/90.5; 104/281, 283, 286

[56] References Cited

U.S. PATENT DOCUMENTS

| | | |
|---|---|---|
| 3,225,608 | 12/1965 | Simon . |
| 3,447,842 | 6/1969 | Steingroever . |
| 3,465,598 | 9/1969 | Simon . |
| 3,492,738 | 2/1970 | Simon . |
| 3,493,274 | 2/1970 | Emslie et al. . |
| 3,552,028 | 1/1971 | Simon . |
| 3,815,963 | 6/1974 | Wilk . |
| 3,831,287 | 8/1974 | Sawdo et al. . |
| 3,874,750 | 4/1975 | Greig . |
| 4,082,376 | 4/1978 | Wehde et al. . |
| 4,381,875 | 5/1983 | Studer . |
| 4,541,772 | 9/1985 | Becker . |
| 4,583,794 | 4/1986 | Takahara et al. . |
| 4,620,752 | 11/1986 | Fremerey et al. . |
| 5,126,317 | 6/1992 | Agarwala .......................... 505/1 |
| 5,126,610 | 6/1992 | Fremerey . |
| 5,177,387 | 1/1993 | McMichael et al. ............... 310/90.5 |
| 5,220,232 | 6/1993 | Rigney, II et al. ................ 310/90.5 |

OTHER PUBLICATIONS

Patent Abstracts of Japan, vol. 013, No. 228 (P-877) May 1989, & JP,A,01 038 605 (Mitsubishi) 8 Feb. 1989.
Patent Abstracts of Japan, vol. 015, No. 291 (E-1093) Jul. 24, 1991, & JP,A 03 103 086 (Komori Mochimitsu) 30 Apr. 1991.
Boerdijk, A. H., "Technical Aspects of Levitation", Philips Res. Rep. 11, 1956, pp. 45–56.
Ponizovskii, V. M., "Diamagnetic Suspension and Its Applications (Survey)", Instruments and Experimetnal Techniques, 1981, vol. 24.
Arkadiev, V., "A Floating Magnet", Nature, vol. 160, Sep. 6, 1947.

*Primary Examiner*—Leo P. Picard
*Assistant Examiner*—Raymond M. Barrera
*Attorney, Agent, or Firm*—John S. Bell

[57] ABSTRACT

Various levitation devices are disclosed in which an array of permanent magnets is levitated by magnetic interaction with a diamagnetic material. Levitation is achieved without using a fixed permanent magnet or other device to supplement the magnetic field of the array. The cost and design constraints resulting from undesirable spring constants produced by such permanent magnets are thereby avoided.

7 Claims, 4 Drawing Sheets

MAGNETIC FIELD LEVITATION

BACKGROUND OF THE INVENTION

1. Field of the Invention

This invention relates to the levitation of magnetic materials by magnetic fields, and more particularly to the suspension of such materials in a state of stable or indifferent equilibrium relative to gravitational attraction. The invention may be incorporated and used for measurement and control in a wide range of instruments such as accelerometers, flow meters, gravity meters, gyroscopes, magnetometers, micrometers, and tilt meters, as well as in nonmeasurement devices such as bearings and other apparatus.

2. Description of the Related Art

There are many applications where it would be desirable to levitate a magnet or a magnetic member. A levitated magnet can be acted on magnetically, and its position can be sensed magnetically. There are significant limitations that must be overcome to levitate a magnet. Magnetostatic or stationary electromagnetic fields will not levitate magnets or magnetic materials unless the field is modified to have a relative magnetic permeability that is less than one at one or more positions. Otherwise, the magnetic material to be suspended will either be expelled from the field or drawn into contact with a magnet providing the field. This phenomenon is referred to as instability. Magnetic fields with stable or indifferent equilibrium can be created by interaction between a permanent magnet and a material having a relative magnetic permeability less than one. The stabilizing magnetic force of such a field is inversely proportional to the relative magnetic permeability.

There are substantial drawbacks to all prior approaches for providing a magnetic permeability that is less than one in order to achieve levitation.

Diamagnetic materials have relative magnetic permeabilities that are lower than one and can be used to provide stable levitation. But the permeabilities are only slightly lower than one and provide low lift force. Large permanent magnets have been used to levitate diamagnetic members. But that is very different from levitating a magnet. One prior reference suggests that the interaction between a magnet and a diamagnetic material could levitate a few microns of the magnetic material. That is not a sufficient volume for use in a practical device. A stronger magnetic field capable of levitating a greater mass of magnetic material would not be attained simply by increasing the mass or quantity of diamagnetic material. Another reference uses a diamagnetic material to provide stability and a second fixed magnet located above a first magnet in order to provide sufficient lift force to levitate the first magnet. Some of the drawbacks of this design are that the second magnet creates substantial magnetic spring constants or forces that distort the motion and limit the stability of the first magnet. The lift magnet also increases size, weight, and cost.

Superconductors have a magnetic permeability of zero and produce higher lift force than diamagnetics. The lift force of the magnetic field produced by the interaction between a magnet and a superconductor is sufficiently large to suspend a magnet in the magnetic field. A permanent magnet of about one gram has been reported suspended above a concave superconducting disk. But applications involving materials in the superconductive state have the limitation of requiring very low temperatures, i.e. around −200° C. or lower. Another approach to levitation is to use a variable electromagnetic field and feedback control to suspend magnetic materials. Drawbacks of electromagnetic devices are that they require power consumption, active control, and increase cost.

SUMMARY OF THE INVENTION

This invention provides a configuration for levitating magnets by a magnetic field that is free of undesirable spring constants and instability. The invention comprises a first member that is defined by an array of magnets or magnetic dipoles which are arranged to provide a high strength, high gradient magnetic field adjacent one surface of the array. More specifically, the magnets are arranged in a side by side sequence with each consecutive magnet having opposite magnetic polarity. This arrangement provides closed loop magnetic flux paths for each two consecutive magnets that intercept both magnetic poles of the two magnets. A second member that is formed from a diamagnetic or other material having a relative magnetic permeability that is less than one interacts with the magnetic field to levitate the magnetic first member. This second member defines a base or area over which the levitated magnetic array may be moved by external forces. Levitation over this area is free of even small undesirable forces because the diamagnetic or other material can be formed without surface irregularities and without magnetic or other impurities that would affect levitation.

The magnetic field provided by the array of magnets has a higher field strength and a higher field gradient than a magnetic field provided by a single magnetic of similar size and shape. The magnetic field from one or more magnets always forms closed loop flux paths. The strength of the field for a given magnetic material is determined by the portion of the closed loop flux paths through air compared with the portion that passes through the magnets. The shorter the portion through air compared to the portion through the magnets, the stronger the magnetic field. For a lone magnet or single magnetic dipole not in an array or near other magnets, the closed loop flux path near the center of the magnet must pass all the way around the edge of the magnet before returning through the other side. This distance is particularly long for thin magnets having only a short distance separating the two magnetic poles, such as are desirable for levitation in order to minimize weight. By comparison, in an array of alternating polarity magnets having the same overall shape as the single thin magnet, a closed loop flux path originating at one magnet to travels only a short distance through air before it re-enters a magnet of opposite polarity. Thus, the array has shorter flux paths through air compared to the path segments through magnetic material, and hence stronger magnetic fields than a single magnet. Similarly with respect to the field gradient, the magnetic field from a lone magnet projects through air over a large area. In an array of alternating polarity magnets, the field from each magnet is drawn to the next consecutive magnet. This limits the range and causes the strength of the magnetic field to change rapidly with displacement along the direction of magnetization.

BRIEF DESCRIPTION OF THE DRAWINGS

FIG. 6b is a top view of of the level shown in FIG. 6a.

DETAILED DESCRIPTION OF THE INVENTION

Figure 1:
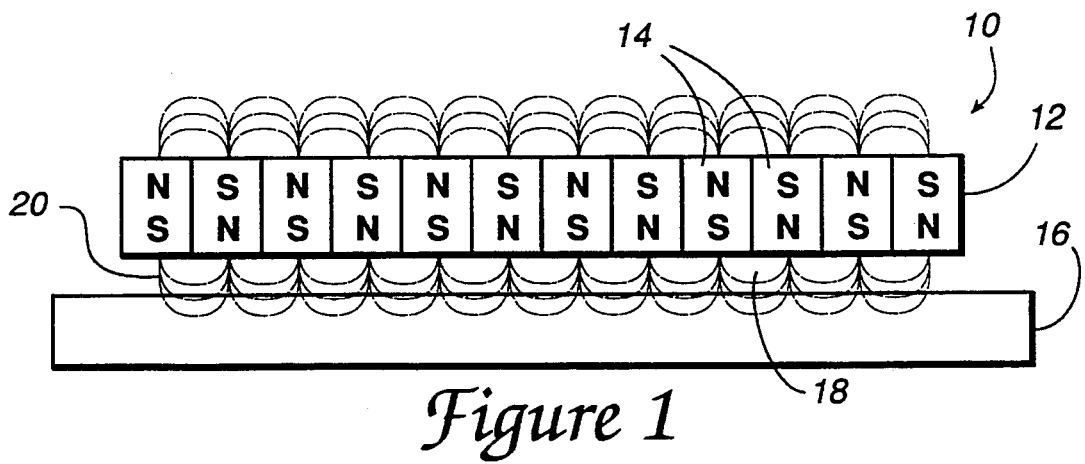
FIG. 1 is a schematic, plan view of an array of magnets levitated above a diamagnetic material.

FIG. 1 shows levitation apparatus 10 comprised of a two-dimensional array 12 of permanent magnets 14 levitated over a layer 16 of pyrolytic graphite. Array 12 comprises an arrangement of alternate polarity magnets. Viewed from above, the alternating north and south poles form a checkerboard pattern. The permanent magnets 14 are formed from neodymium-iron-boron of grade 35 megagauss-oersted or higher. This material is a strongly magnetic rare earth composition. The pyrolytic graphite 16 is a diamagnetic material. It has the lowest relative magnetic permeability or value closest to zero of the common diamagnetics. Pyrolytic graphite has an oriented structure of graphite crystal layers. The crystal layers (not shown) of the rectangular block 16 are oriented parallel to the bottom face of array 12. With respect to dimensions, each magnet 14 is of rectangular box shape and measures $0.5 \times 0.5 \times 0.25$ mm. The 0.25 mm is the thickness dimension, which is also the direction of magnetization or direction along which the magnetic poles are spaced. These dimensions are typical optimum dimensions. They provide a ratio of thickness divided by width that is 0.5 for each magnet 14. The range of variation for practical dimensions of the apparatus 10 encompasses a thickness to width ratio of 0.3–0.8, and thickness for each individual magnet 14 less than about 2.0 mm.

In operation, the arrangement of magnets in array 12 shown in FIG. 1 produces a magnetic field 20 in the gap or area 18 between the array 12 and surface 16 that has both a high magnetic strength and a high gradient along the direction of magnetization. The pyrolytic graphite 16 interacts with this magnetic field to produce a lift force that levitates the magnetic array 12 above surface 16 in a state of indifferent equilibrium. The array floats above surface 16 with no spring constant or force attracting it to a particular position or accelerating it in any particular direction. The magnetic strength of the field 20 changes rapidly as a function of distance from the array 12. For the specific dimensions noted above, the gap 18 will be about 25 to 50 μm or 0.001" to 0.002".

Figure 2:
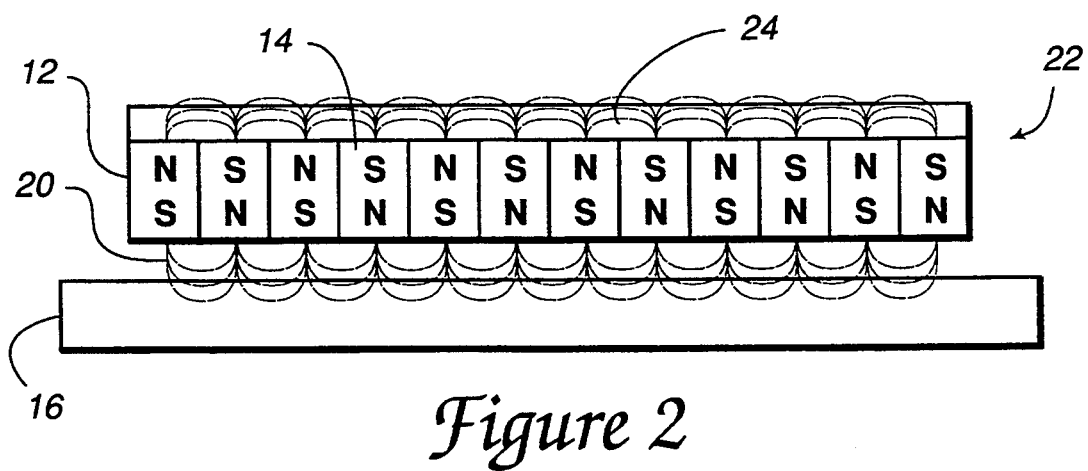
FIG. 2 is a schematic, plan view of a modification of the levitation apparatus of FIG. 1 that includes a layer of ferromagnetic material.

FIGS. 2 through 7 illustrate various modifications of the levitation apparatus 10 shown in FIG. 1. Common components are designated with the same numerals in all figures. FIG. 2 shows levitation apparatus 22 having a layer 24 of ferromagnetic material placed across the top of array 12. Ferromagnetic layer 24 provides a low resistance magnetic path above array 20 that increases the flux density of field 20 in the gap 18 between the array 12 and surface 16. This increased flux density provides a higher lift force that will levitate a greater mass of material.

Figure 3:
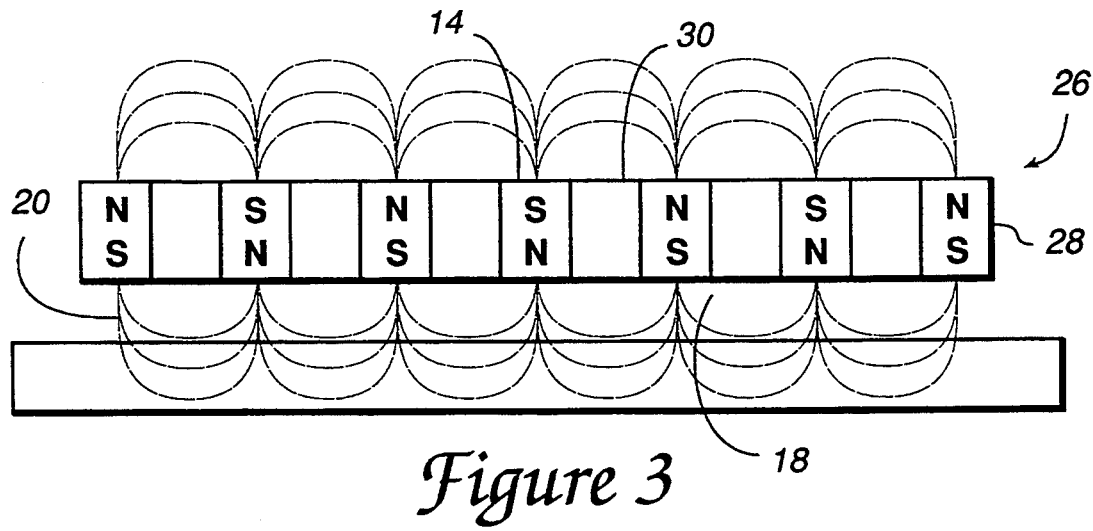
FIG. 3 is a schematic, plan view of a modification of the levitation apparatus of FIG. 1 that includes nonmagnetic spacers between the magnets.

FIG. 3 shows levitation apparatus 26 comprised of an array 28 in which the magnets 14 are spaced apart rather than adjacent to each other as shown in FIGS. 1 and 2. The array 28 includes spacer elements 30 formed from a material that is substantially nonmagnetic placed between consecutive magnets 14. Such spacers 30 increase the distance between the magnetic poles of consecutive magnets, which in turn decreases the gradient of the magnetic field 20 in gap 18. This lower gradient field provides a lower lift force and will not support as large a mass as the apparatus shown in FIGS. 1 and 2. But the size of the gap 18 is increased as shown in FIG. 3, and the position of material that will be supported is at a greater distance from surface 16 than provided by the other illustrated embodiments.

Figure 4:
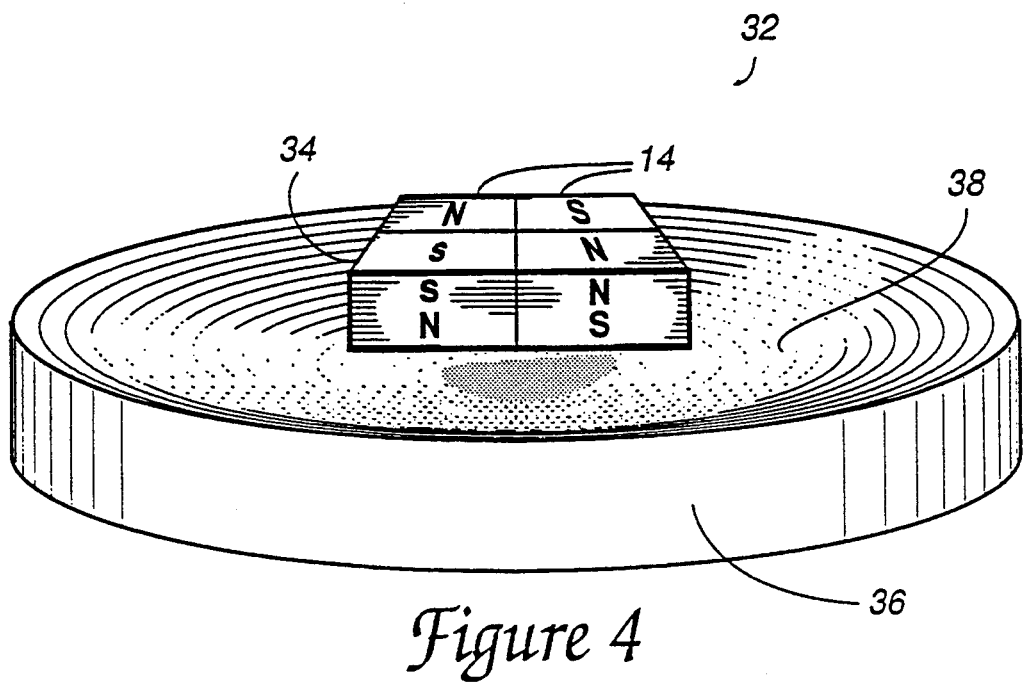
FIG. 4 is a schematic, perspective view of a two-dimensional array of magnets levitated above a diamagnetic material.

FIG. 4 shows levitation apparatus 32 comprised of a two-dimensional array 34 floating above a layer of diamagnetic material 36. A shallow bowl shape 38 is machined into the top surface of layer 36. The array 34 includes four magnets 14 arranged in a square configuration. Array 34 is a small version of array 12. Array 34 has no net magnetic dipole moment because the two magnets with vertically upward polarizations are balanced by the two magnets with vertically downward polarizations. Arrays such as array 34 with zero net dipole moment are preferred for many applications because they are less sensitive to being twisted or turned about an axis parallel to surface 38 by magnetic interaction with either the earth's magnetic field or with the diamagnetic material. This sensitivity to twisting can be avoided with rectangular arrays having a different number of consecutive magnets along one dimension than another, as well as with square configurations. The shallow bowl-shaped surface 38 in the top of diamagnetic layer 36 provides the magnetic array 34 with stable equilibrium rather than the indifferent equilibrium provided by the flat surfaces shown in FIGS. 1, 2, and 3. The bowl shape of surface 38, and corresponding configuration of magnetic interaction between that surface and the array 34 causes array 34 to be drawn by gravity toward the center of layer 36. Array 34 is thereby kept from floating off the diamagnetic member 36.

Figure 5:
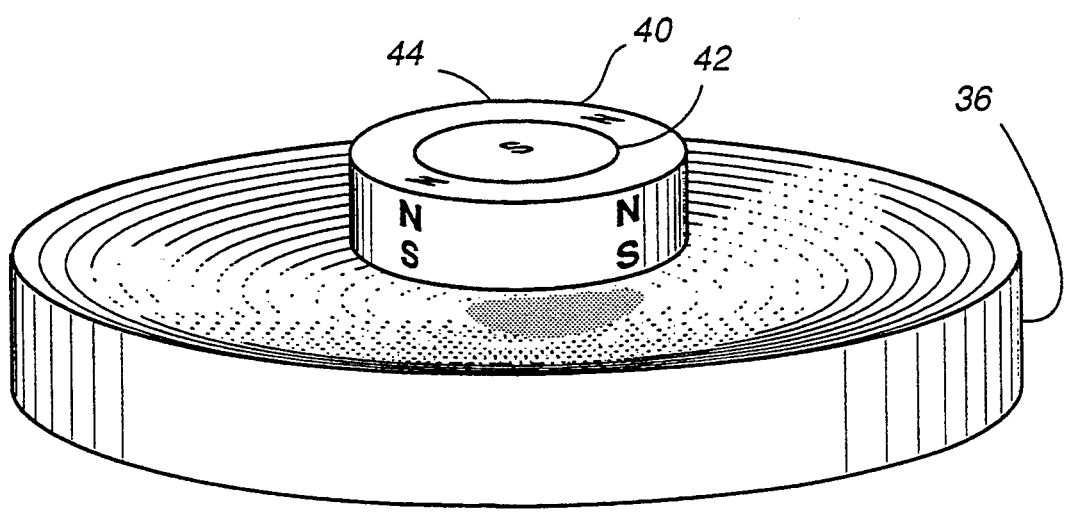
FIG. 5 is a schematic, perspective view of a sequence of concentric ring magnets levitated above a diamagnetic material.

FIG. 5 shows an array 40 of magnets comprised of a small central cylinder 42 encircled by a concentric ring 44 of opposite magnetization. The radius of the central cylinder 42 is chosen to be $1/\sqrt{2}$ times the outer radius of the ring 44. Other dimensions can be used, but with this choice the central cylinder 42 will be magnetically balanced by the outer ring 44. The two-magnet array 40 has no net magnetic dipole moment. Levitated over a piece of pyrolytic graphite 36 with a gap 18 of 0.025 mm (0.001"), the two-magnet array 40 has approximately 75 percent greater levitation force than a single magnet disc formed from the same magnetic material with the same overall dimensions as the two-magnet array 40.

Arrays with more than two concentric magnets will have even greater levitation force.

Figure 6B:
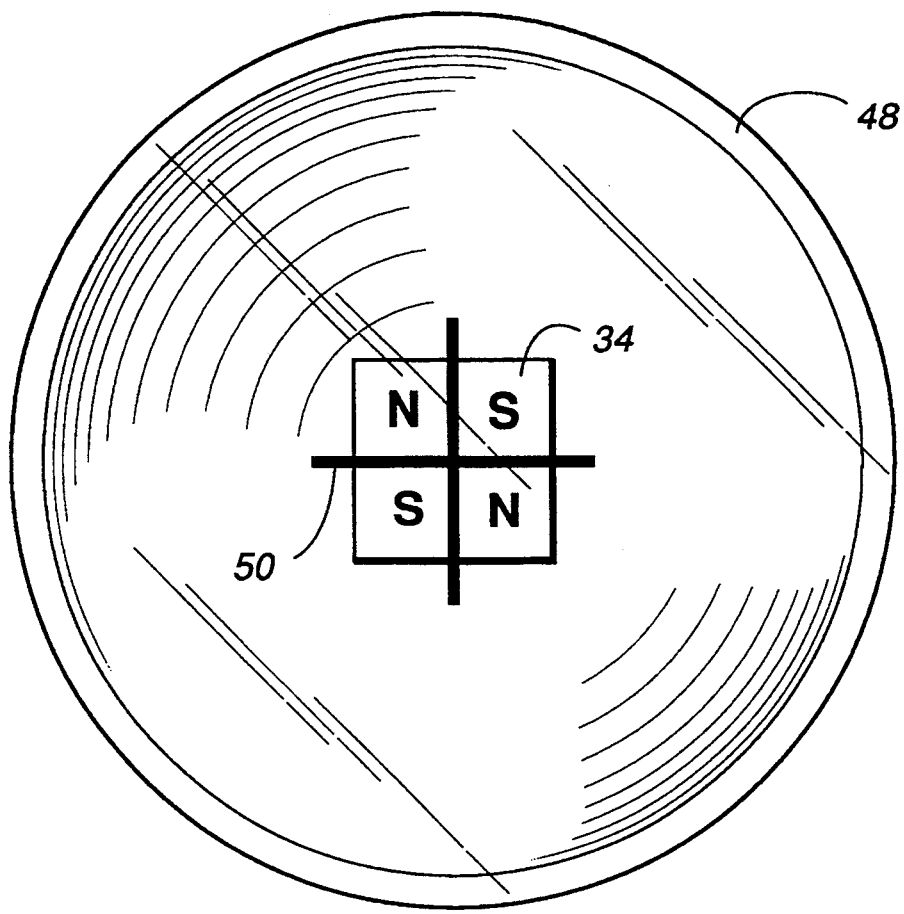
Figure 6A:
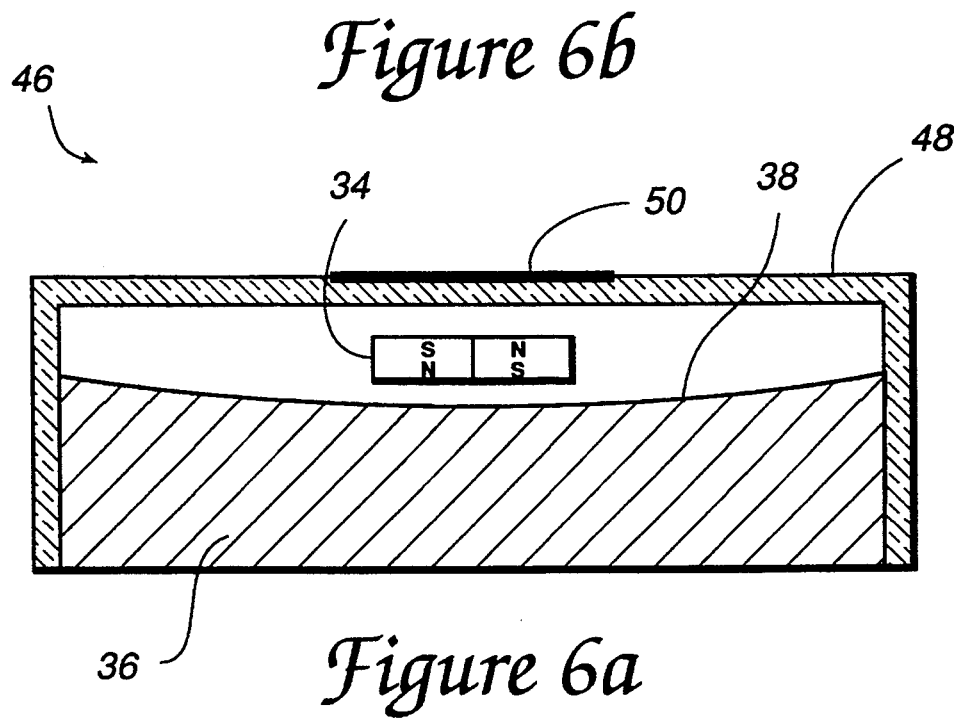
FIG. 6a is a cutaway cross sectional view of a level having a magnetic array levitated above a diamagnetic material.

FIG. 6 shows a two-dimensional level 46 for detecting tilt. The level is comprised of a transparent cover 48 with visual alignment marks 50. Cover 48 encloses an array 34 of magnets levitated above a layer of diamagnetic material 36 similar to that shown in FIG. 4. Operation of the two-dimensional level 46 is similar to that of a more conventional two-dimensional bubble type level. The alignment marks 50 indicate the position of array 34, and thereby the tilt of level 46. But compared to a conventional bubble level, the diamagnetic level 46 is more sensitive, lighter weight because of no need for a liquid, and free from liquid leaks. When the level 46 is placed on a horizontal surface, the levitated array 34 will line up with the alignment marks 50. If the surface is tilted, the array 34 will stabilize over the portion of the bowl 38 that is locally horizontal relative to the earth. Since that horizontal portion will be away from the alignment marks 50, the array will stabilize off to the side of the marks. Thus, tilted surfaces are detected by the position of the array 34 relative to the marks 50.

Figure 7:
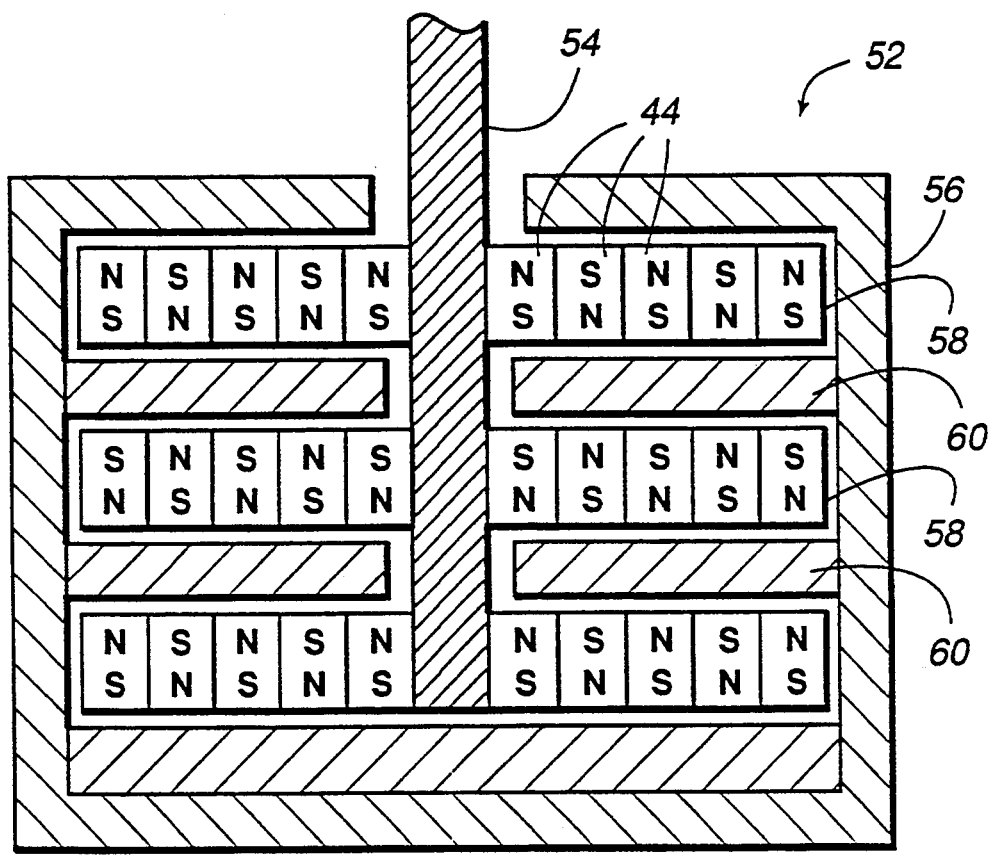
FIG. 7 is a cutaway cross sectional side view of a bearing having cylindrical magnetic arrays that project from a central shaft interleaved between layers of a diamagnetic material.

FIG. 7 shows a bearing 52 comprised of a shaft assembly 54 suspended in a housing 56. A plurality of discs 58 which are comprised of concentric magnetic rings 44 that are similar to the ring 44 shown in FIG. 5 are spaced along shaft 54. The discs 58 are interleaved between discs 60 of diamagnetic material that are attached to and project inwardly from the outer shell of housing 56. Magnetic interaction between the magnets 44 and multiple layers of diamagnetic material 60 produce a large lift force and low spring constant in the circumferential direction for shaft rotation.

There are many modifications and variations that can be made to the levitation apparatus of this invention in addition to the variations shown in FIGS. 1 through 7. For example, levitation can be achieved with materials other than those specifically noted. This includes materials that provide lower lift forces. The magnets 14 may be either other rare earth magnets or also lower strength magnets not formed from rare earth materials. The layer 16 may be comprised of other diamagnetic materials having higher relative magnetic permeability such as bismuth. Or, the diamagnetic layer can be replaced by a superconductive material which has a lower relative magnetic permeability, namely zero. The interaction with the superconductor will provide a higher lift force that can levitate a larger mass. But there will also be the requirement to cool the superconductor. As another variation, there are a number of alternatives to the shallow-machined surface 38 shown in FIG. 4 that can be used to urge or draw the magnetic array toward a desired location. For example, a small force that will attract an array to a preferred location can be provided by forming a small indentation at a selected location in an otherwise flat diamagnetic surface. Or, particles of magnetic material could be embedded in the diamagnetic material at a preselected location to provide a small magnetic attraction to the magnetic array.

With respect to modifications of the level 46 shown in FIG. 6 and other instruments, a one-dimensional diamagnetic level can be provided by making the bowl 38 long and narrow. In such configurations alignment would be taken only along one axis. The level 46 can also be made into a tiltmeter by putting gradations on the transparent cover 46 rather than simple alignment marks 50. Or, electronic sensing apparatus using either optical or magnetic sensors could be used to identify the position of the levitated array 34. Electronic versions will be more sophisticated than the visual embodiment shown in FIG. 6 and increase accuracy. There is an increased cost, but it is moderate as the electronics are within the state of the art and fairly simple. As another variation, other measuring devices can include three-dimensional levitated members that project high strength, high gradient magnetic fields in all directions. Examples include cubes with each side formed from a flat array as shown in FIG. 4 and spheres with magnets displaced radially. Such members can be enclosed in larger cubes, spheres, or other housings of diamagnetic material, with sensors placed to detect motion relative to different axes.

Having thus described the invention what is claimed is:

1. A method of levitating a magnetic member relative to the gravitational attraction of the earth comprising the steps of:

arranging a plurality of magnets to form a first member comprised of said magnets having both a high magnetic strength and high magnetic gradient adjacent a predetermined portion of said first member, wherein said step of arranging comprises disposing said magnets in a consecutive sequence with each two consecutive magnets having opposite magnetic polarity;

providing a second member comprised of a diamagnetic material having a relative magnetic permeability less than one at ambient temperatures; and positioning said first and second members proximate each other with said predetermined portion of said first member facing said second member, whereat magnetic interaction between said members levitates said first member relative to a full gravitational attraction of at least 1 g without requiring magnetic field supplement from another magnetic source.

2. The method of claim 1 in which:

said step of providing said second member provides a diamagnetic member comprised of either graphite or bismuth; and said step of positioning said first and second members provides a magnetic interaction that levitates said first member relative to a full gravitational attraction of at least 1 g.

3. The method of claim 1 in which:

said step of arranging said magnets comprises arranging a plurality of permanent magnets, each formed from a strongly magnetic material and each having a north magnetic pole and a south magnetic pole separated by a straight line section of magnetic material, into a consecutive sequence in which each two consecutive magnets define a closed loop magnetic flux path that intercepts both of said magnetic poles of said two consecutive magnets; and said step of positioning said first and second members comprises positioning said members such that a geometric extension of said straight line separation of said magnetic north and south poles for each of said magnets defines a direction that intercepts said second member.

4. The method of claim 3 in which said step of arranging said magnets comprises arranging magnets having a first dimension parallel to said separation of said north and south magnetic poles and a second dimension perpendicular to said first dimension and a ratio of said first dimension to said second dimension between about 0.3 and 0.8.

5. The method of claim 3 in which:
said step of arranging magnets provides plurality of disk shaped first members that are substantially identical to each other and disposed at spaced intervals along a shaft;
said step of providing said second member provides a plurality of disk shaped second members comprised of said diamagnetic material that are disposed at spaced intervals from each other; and
said step of positioning said first and second members comprises positioning said first and second disk shaped members such that they are interleaved and substantially parallel to each other.

6. The method of claim 1 further including the step of moving said first member relative to said second member by magnetic interaction with said first member.

7. The method of claim 1 further including the step of sensing the position of said first member relative to said second member.

* * * * *